Feb. 1, 1927.
E. RYDER
1,615,916
SHOCK ABSORBER
Filed Oct. 16, 1925  2 Sheets-Sheet 1
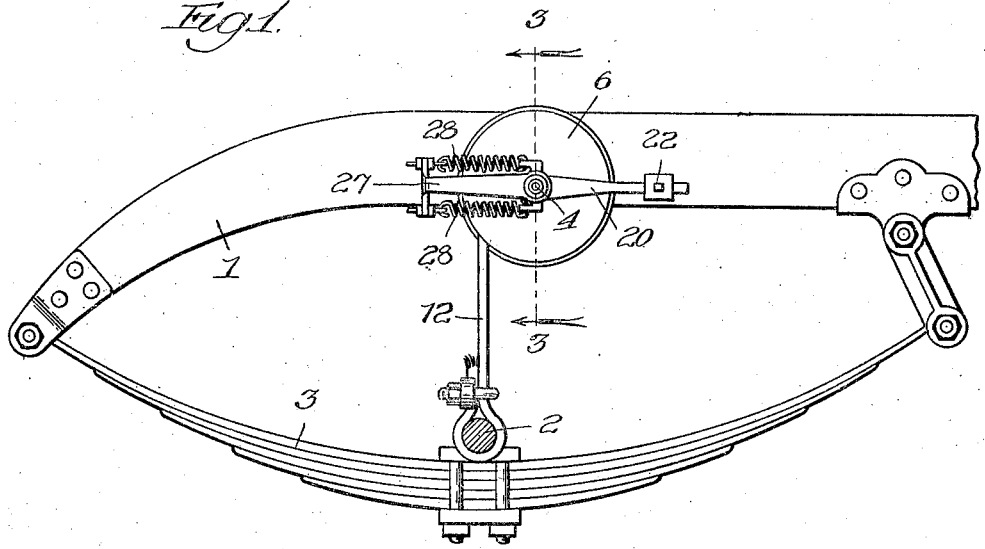
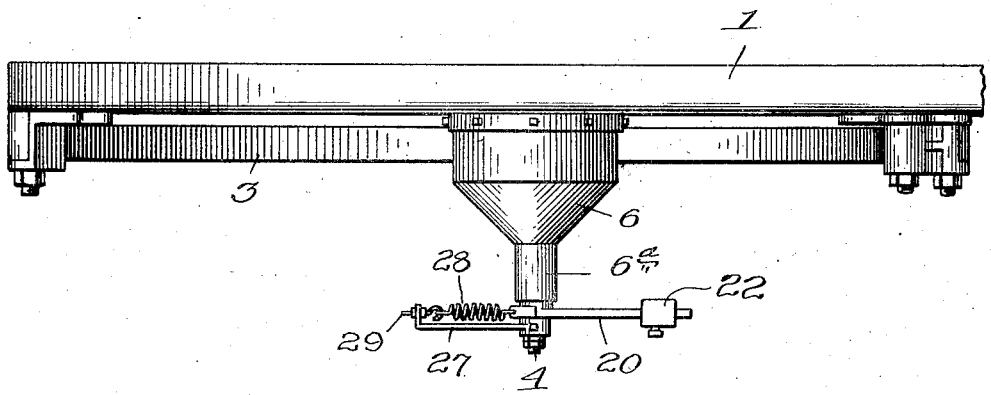
Inventor:
Elmer Ryder,

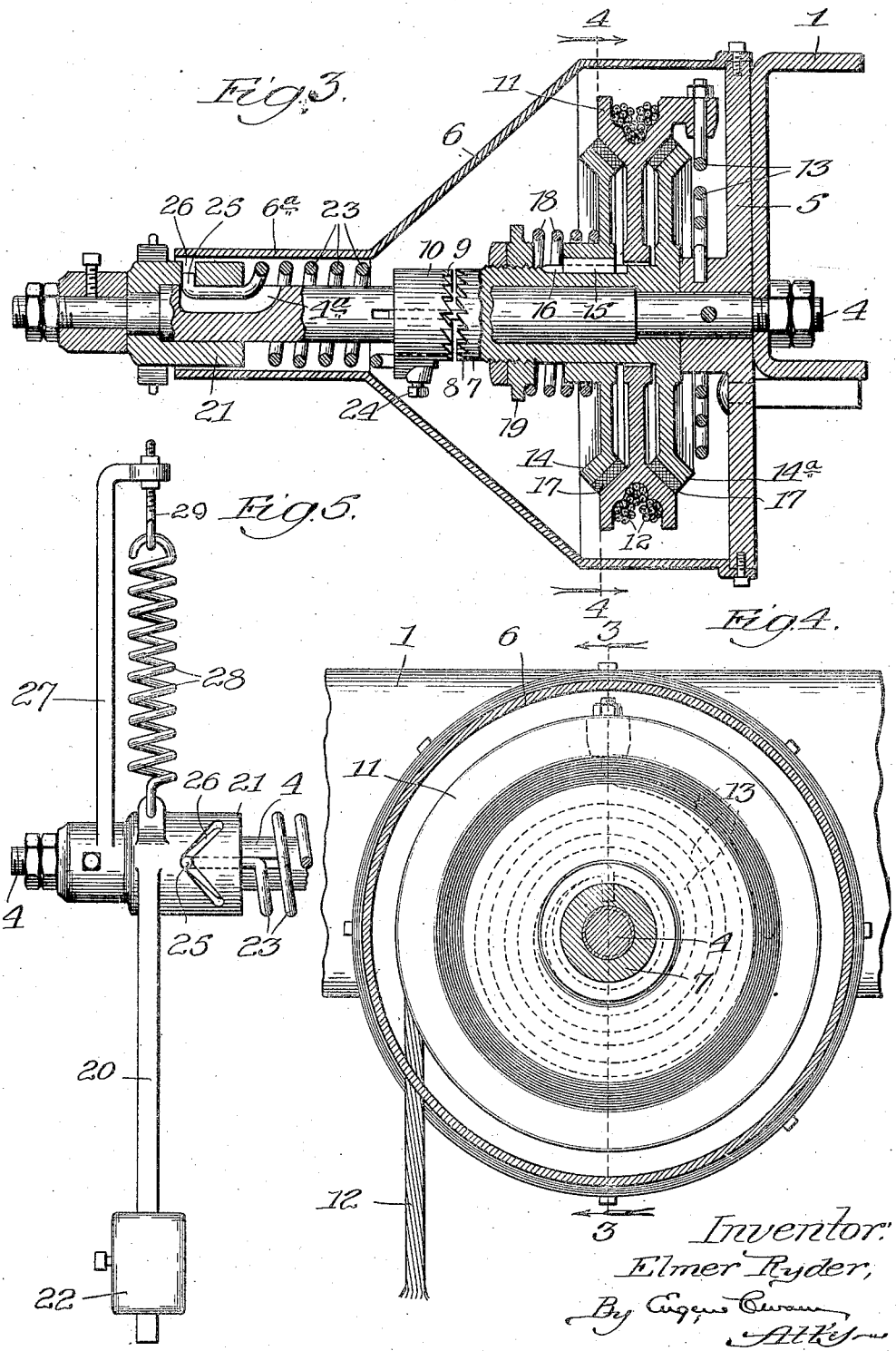

Patented Feb. 1, 1927.

1,615,916

UNITED STATES PATENT OFFICE.

ELMER RYDER, OF BERWYN, ILLINOIS.

SHOCK ABSORBER.

Application filed October 16, 1925. Serial No. 62,712.

In connection with my experiments and manufacture of shock absorbers for automobiles and other motor vehicles, I have observed that the tendency of the frame of the car is to remain at a more or less constant level above the roadway especially at the higher speeds. With shock absorbers as heretofore generally employed, the frame and axles are directly connected through the medium of the flexible straps or cables constantly under tension, due to the winding action of the springs thereon. With these devices the horizontal level of the frame is constantly disturbed, due to the repeated downward pulls of the shock absorber straps as the wheels travel over the more or less small irregularities of the road surface. This is especially noticeable when traveling over brick pavements as the wheels vibrate rapidly up and down due to the uneven contour of such pavements, and with shock absorbers as heretofore made the downward pulls on the frame are repeated and rapid, thus vibrating the frame to lessen the easy riding qualities of the car.

My present invention contemplates shock absorbers which will avoid the objections above noted and be rendered inactive to these repeated smaller shocks, so as not to disturb the normal level of the frame in the travel of the car and thus make for more easy and pleasant riding. I accomplish this object by providing a mechanical clutch device in each absorber assembly so that the winding spring of the strap or cable may normally work free to the vertical vibrations of the wheels due to these lesser shocks and thus not transmit such shocks to the frame to disturb it out of its normal plane. In connection with this clutch means, I employ other means for automatically rendering the absorber active to absorb shocks whenever the frame is disturbed out of its normal line of motion as by the wheels dropping into large holes in the roadway or running over projections of sufficient height to disturb the frame.

My invention further contemplates the use of a weighted member co-operating with the clutch device for automatically throwing the shock absorber into and out of clutch or gear with the frame, such weighted member being double acting so as to cause the absorber to respond to upward as well as downward vibrations of the frame.

My invention further contemplates a purely mechanical structure for accomplishing the objects above, and thus obtain a constantly acting device not affected or disturbed by temperature conditions, this being a decided advantage over hydraulic devices which use either oil, glycerine, or other liquid, which is much too thin in summer and too thick in winter to be constantly effective. Moreover, with a mechanical device as contemplated by my invention, the price of manufacture is materially reduced as compared to hydraulic devices.

The invention consists further in the matters hereinafter described and claimed.

In the accompanying drawings—

Fig. 1 is a side view of a shock absorber constructed in accordance with my invention and shown applied to a car;

Fig. 2 is a top plan view of the parts shown in Fig. 1;

Fig. 3 is an enlarged vertical sectional view through the absorber on line 3—3 of Fig. 1;

Fig. 4 is a similar view on line 4—4 of Fig. 3; and

Fig. 5 is a top plan view of the weighted arm and spring assembly.

In the drawings, 1 indicates the side member of the main frame or chassis of a motor vehicle; 2 an axle below the same, and 3 a spring connecting the axle and frame together in accordance with motor car design.

The shock absorber of my invention, as shown in section in Fig. 3, has a central non-rotative shaft 4 extending laterally outward from the frame member 1, being clamped thereto by nuts on the threaded inner end of said shaft. Fixed to the shaft 4 just outside of the frame 1 is a back plate 5 to which is secured the housing 6 for the entire device. Loose on the shaft 4 is a sleeve 7 having clutch teeth 8 at its outer end to engage with clutch teeth 9 on the opposed clutch collar 10 splined on the shaft, as shown.

Loose on the sleeve 7 is a drum or sheave 11, about which winds or wraps a flexible member 12, which may be either in the form of a strap or cable, as may be desired. In either form, the drum 11 will be provided with a peripheral groove, as shown in Fig. 3. The drum 11 is acted on by a coiled spring 13 for winding the flexible member 12 thereon. This spring is connected at one end to the drum 11 and at the other end to a central boss on the back plate 5, as shown, On opposite sides of the drum 11 are discs 14, 14ª, the latter being fixed to the sleeve 7, as by being made integral therewith. The other disc 14 is splined on the sleeve 7 by a key 15 in a groove 16 in the sleeve, as shown. The outer peripheral portions of these discs have outwardly extending inclined flanges to support friction rings 17, 17, which are interposed between the discs and the drum 11, as shown in Fig. 3. The drum also has inclined surfaces to accommodate these rings. A helical spring 18 surrounds the sleeve 7 between an adjusting collar 19 threaded on the sleeve 7 and the disc 14 so as to hold the friction bands 17 in engagement with the drum 11. A suitable lock nut follows the collar 19 to hold it in adjusted positions.

An arm 20 is pivotally mounted on the outer end of the shaft 4 by having a hub portion 21 at its inner end receiving the outer end of the shaft. Said arm is provided with an adjustable weight 22. A helical spring 23 surrounds the portion of the shaft 4 between the hub 21 and the clutch collar 10. The inner end of the spring 23 is connected with said collar by a set screw 24, and the outer end of the spring is turned outwardly, as at 25, and operates in the cam groove 26 in the hub 21, as shown in Figs. 3 and 5.

The shock absorber of my invention is secured to the frame member 1 in a position with the arm 20 substantially horizontal, as shown in Fig. 1, and the flexible member 12 is extended to and clamped about the axle 2. The device has a bracket 27 fixed to the outer end of the shaft 4 by means of a set screw or otherwise and disposed to be also horizontal and extends on the side of the shaft opposite the arm 20, as shown in Figs. 1, 2, and 5. Coiled springs 28, 28 connect the other end of the bracket 27 with ears on the hub portion 21 of the arm 20 and, being disposed on opposite sides of the pivotal axis of the arm when horizontal, maintains a tension or pull on the arm to maintain it normally in a horizontal plane. As shown in Fig. 5, the cam slot 26 is substantially V-shape and is disposed with its axis toward the outer end of the shaft 4 so that the side portions of the slot diverge outwardly and extend toward the rear end of the shaft.

When the arm 20 is horizontal, the outer end 25 of the spring 23 lies in its neutral position at the apex of the slot 26 and holds the clutch collar 10 out of clutched engagement with the sleeve 7, as shown in Fig. 3. At this time the shock absorber is ineffective to absorb shocks in that the drum 11 and its friction discs are free to revolve in unison on the shaft 4. In the upward or downward movement of the frame member 1 out of its normal horizontal plane, as happens when the wheels travel over a projection or drop into a hollow or hole in the roadway, the normal level of the frame is disturbed and a like effect is produced on the arm 20, causing it to swing about the shaft 4 due to the lagging action of its weight 22. This turns the hub portion 21 of the arm and causes the end 25 of the spring 23 to enter either one of the inclined side portions of the cam slot 26 with the result that the spring 23 is compressed, thereby causing the clutch collar 10 to be moved into clutch engagement with the sleeve 7.

On the downward movement of the frame 1, the clutch teeth 8 and 9 slip past each other until the beginning of the recoil of the vehicle spring 3. Then the clutch teeth connect the sleeve 7 to the shaft 4 and hold the discs 14, 14ª against rotation. These discs being pressed tightly against the drum 11 resist the free rotation of the drum through the friction bands 17 so as to absorb or check the rebound of the frame and allow it to recede gradually back to its normal plane. The teeth 8 and 9 remain clutched until the frame 1 settles to its normal plane, whereupon the arm 20, returning to its normal horizontal position, causes the clutch to disengage the shock absorber from the frame due to the fact that the outer end of the spring 23 comes to its neutral position at the apex of the groove 26.

On the upward movement of the frame 1 above its normal plane, the clutch teeth engage to connect the absorber to the shaft 4 and absorb or check the shock imparted to the frame.

The tension of the springs 28 may be adjusted to regulate the responsiveness of the arm to the frame's movement, as by providing hooks 29 threaded through the ears or lugs on the outer end of the bracket 27, as shown. The casing 6 has an outwardly extending tubular portion 6ª to surround the spring 23 and hub 21 of the arm 20, as shown in Fig. 3, so as to enclose and protect the parts. As shown in said figure, the shaft 4 is provided with a fairly deep slot 4ª adjacent the hub 21 to receive the adjacent end of the spring 23. This slot holds the spring against turning about the shaft 4 and also allows the spring to yield endwise in the movement of the collar 10 into and out of clutched engagement with the sleeve 7. The slot 4ª has a depth equal to twice the gauge of the wire of the spring 23, so that by depressing the end portion of the spring in the slot its upturned end 25 may be engaged with and disengaged from the cam slot 26 in assembling and disassembling the device. Moreover, this construction tends towards compactness of structure by keeping the spring within the diameter of the hub 21.

Under normal conditions the clutch device 7—10 is disengaged, so that the drum 11 is free to turn to take up slack in the cable in slight vibrations and shocks that may be imparted to the wheels due to general irregularities in the road surface. This avoids transmitting any shocks or vibrations to the frame and consequently promotes easy riding, as there is no repeated jerking or pulling down on the frame by the flexible member 12 as in shock absorbers as generally heretofore constructed. When the normal level of the frame is disturbed, as when the wheels drop into an unusual hole in the roadway or pass over an unusual bump or projection, the clutch 7—10 functions to connect the shock absorber with the frame and absorbs these shocks, as heretofore stated. Thus it will be seen that with my invention mechanical means are provided for automatically rendering the shock absorber ineffective when the frame is in its normal plane and effective at other times.

The details of structure shown and described may be variously changed and modified without departing from the spirit and scope of my invention.

I claim as my invention:

1. The combination with a spring connected vehicle frame and axle, of a shock absorber connected thereto, opposed clutch members associated with said absorber, and means including a cam action responsive to the movement of the frame out of and into its normal plane for automatically throwing the absorber into and out of effective connection with the frame and axle by connecting and disconnecting said clutch members.

2. The combination with a spring connected vehicle frame and axle, of a shock absorber connected therewith, opposed clutch members associated with said absorber, and means including a pivotally mounted weighted arm responsive to the movement of the frame out of and into its normal plane for connecting and disconnecting said clutch members.

3. The combination with a spring connected vehicle frame and axle, of a non-rotative shaft carried by said frame, a sleeve loose on said shaft and having clutch teeth, a spring wound drum loose on said sleeve, a flexible member connected with and wound on said drum and secured to said axle, friction means carried by said sleeve and engaging said drum, a collar splined on said shaft and having clutch teeth, and means responsive to the movement of the frame out of and into its normal plane for moving said collar into and out of clutch engagement with said sleeve.

4. The combination with a spring connected vehicle frame and axle, of a non-rotatable shaft carried by said frame, a shock absorber loose on said shaft and having a flexible member connected with said axle, opposed clutch members, one in the form of a collar splined on said shaft and the other being loose on said shaft and connected with said absorber, a weighted arm pivoted on said shaft and maintained normally horizontal, and cam means between the arm and collar for moving the latter into and out of clutch with said clutch members in the movement of the frame out of and into its normal plane.

5. The combination with a spring connected vehicle frame and axle, of a non-rotatable shaft carried by said frame, a shock absorber loose on said shaft and having a flexible member connected with said axle, opposed clutch members, one in the form of a collar splined on said shaft and the other being loose on said shaft and connected with said absorber, a weighted arm pivoted on said shaft and maintained normally horizontal, said arm having a V-shaped cam slot, and a spring connected at one end with said collar and having its other end working in said slot in the movement of the arm into and out of its horizontal plane.

6. The combination with a spring connected vehicle frame and axle, of a non-rotatable shaft carried by said frame, a shock absorber loose on said shaft and having a flexible member connected with said axle, opposed clutch members, one in the form of a collar splined on said shaft and the other being loose on said shaft and connected with said absorber, a weighted arm pivoted on said shaft and maintained normally horizontal, said arm having a V-shaped cam slot, a helical spring surrounding said shaft between said arm and collar and having its outer end outturned and working in said slot and its inner end fixed to said collar, and a longitudinal groove in the shaft for the outer end of said spring, said groove being deep enough so that the spring may be depressed out of engagement with said slot.

7. The combination with a spring connected vehicle frame and axle, of a non-rotative shaft carried by said frame, a shock absorber loose on said shaft and having a clutch member, a clutch collar splined on said shaft, a weighted arm pivoted on said shaft and connected with said collar for moving the same into and out of clutch with said clutch member, a bracket fixed to said shaft, and springs connected to said bracket and arm and arranged on opposite sides of the pivotal axis thereof for normally maintaining the arm in a horizontal plane.

In testimony whereof I affix my signature this 13th day of October, 1925.

ELMER RYDER.